(12) United States Patent
Neff

(10) Patent No.: US 8,764,207 B2
(45) Date of Patent: Jul. 1, 2014

(54) CEMENTITIOUS SOLAR TROUGH

(76) Inventor: Jacque A. Neff, Sahuarita, AZ (US)

( * ) Notice: Subject to any disclaimer, the term of this patent is extended or adjusted under 35 U.S.C. 154(b) by 1205 days.

(21) Appl. No.: 11/535,373

(22) Filed: Sep. 26, 2006

(65) Prior Publication Data

US 2008/0121226 A1    May 29, 2008

(51) Int. Cl.
*G02B 5/08* (2006.01)
*F24J 2/08* (2006.01)
*F24J 2/12* (2006.01)

(52) U.S. Cl.
USPC ............................ 359/883; 126/684; 126/690

(58) Field of Classification Search
USPC .......................................... 359/871; 126/690
See application file for complete search history.

(56) References Cited

U.S. PATENT DOCUMENTS

| | | | | |
|---|---|---|---|---|
| 3,049,055 A | * | 8/1962 | Tubbs | 359/846 |
| 4,124,277 A | * | 11/1978 | Stang | 359/846 |
| 4,325,360 A | * | 4/1982 | Kelley | 126/651 |
| 4,602,853 A | * | 7/1986 | Barr | 359/852 |
| 5,058,345 A | * | 10/1991 | Martinez | 52/309.11 |
| 5,069,540 A | | 12/1991 | Gonder | |
| 6,254,243 B1 | * | 7/2001 | Scrivens | 359/883 |
| 6,718,712 B1 | * | 4/2004 | Heath | 52/309.12 |
| 7,073,306 B1 | | 7/2006 | Hagaman | |
| 2005/0284088 A1 | | 12/2005 | Heath | |

OTHER PUBLICATIONS

"bale." Merriam-Webster Online Dictionary. 2009. Merriam-Webster Online. Apr. 23, 2009 <http://www.merriam-webster.com/dictionary/bale>.*

* cited by examiner

*Primary Examiner* — Jade R Chwasz
(74) *Attorney, Agent, or Firm* — Quarles & Brady LLP; Gavin J. Milczarek-Desai

(57) ABSTRACT

A solar trough including a reflective surface formed parabolic along an axis and a parabolic trough structure composed of at least one cementitious material. The trough structure is made strong and light by the addition of a filler material within the cement, such as a bale of straw or other fibers.

8 Claims, 4 Drawing Sheets

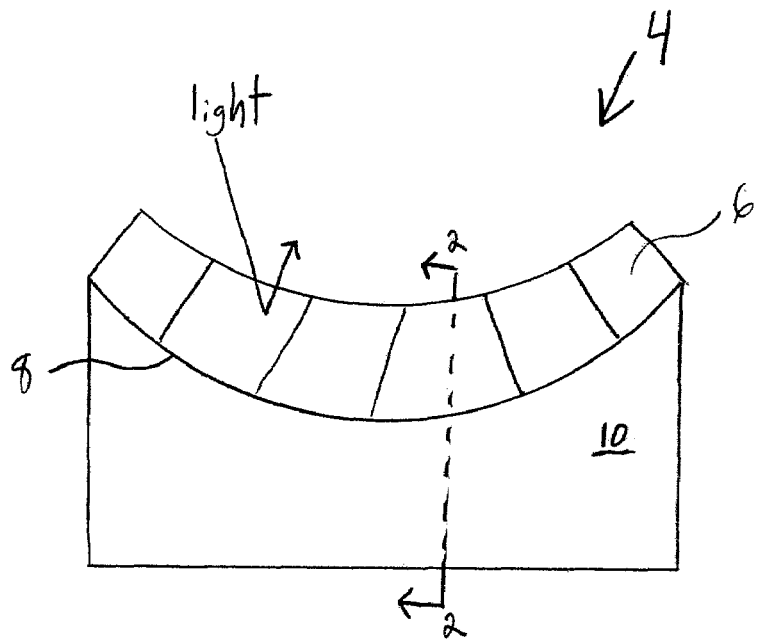
fig. 1
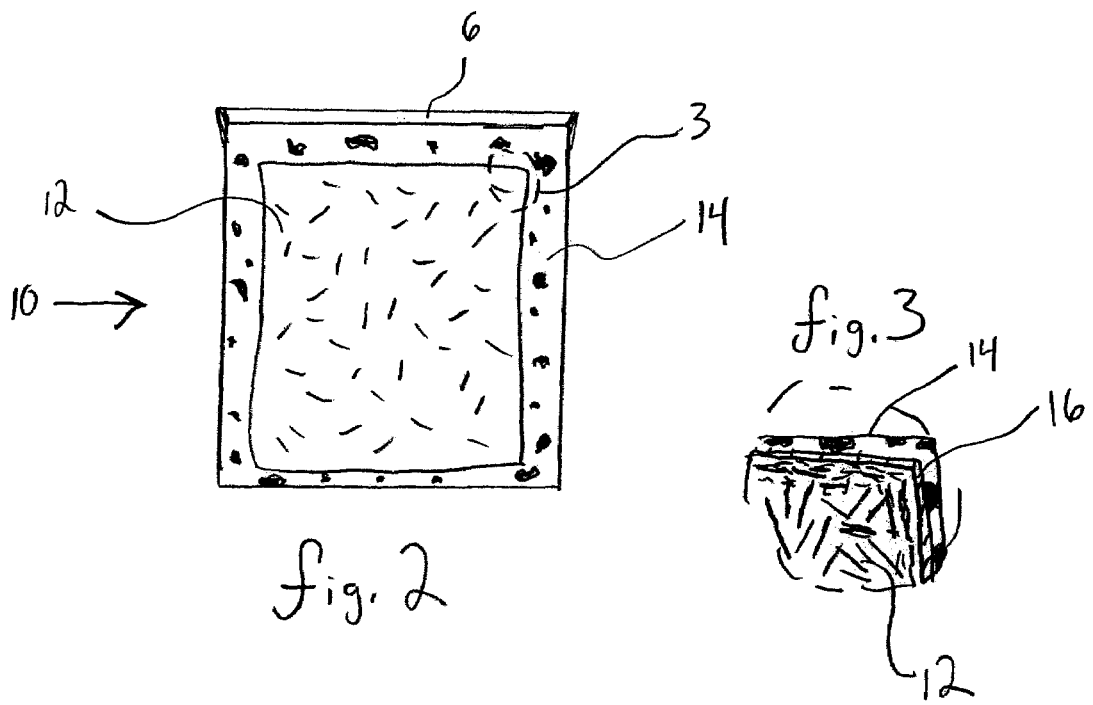
fig. 2
fig. 3

CEMENTITIOUS SOLAR TROUGH

BACKGROUND OF THE INVENTION

1. Field of the Invention

The present invention relates in general to solar energy collection, and, more particularly, to cementitious trough structures that collect radiant energy from the sun and methods for making such structures.

2. Description of the Related Art

Photovoltaic (PV) cells have been used to convert solar radiant energy into electricity for many years now. However, despite substantial investment, they have not been widely adopted by the energy industry to generate electricity. There are a couple of reasons for this circumstance.

PV cells are very expensive to create per unit area. Their high cost has made the energy they produce too expensive to compete with conventional sources of energy, such as natural gas and coal.

One way to reduce the area of PV cells needed to produce electricity is to concentrate sunlight onto the cells. If a collector can concentrate sunlight by a factor of 500, then 500 times less area of PV cells is needed to produce the same amount of electricity. Hence, the cost of the energy produced should be vastly reduced.

The idea of concentrating sunlight onto PV cells is not a new one, but the cost and problems associated with building a collector, known in the industry as a solar concentrator, more than offset the cost savings in the reduced number of PV cells. This has prevented PV cells adoption for large-scale electrical energy production.

Many solar concentrators fall into three primary design categories. The first design category is the parabolic dish. This design uses a single parabolic mirror that is similar in shape to a large satellite dish. The mirror collects sunlight and focuses it to a focal point. At this focal point can be PV cells or a heat engine such as a sterling engine.

The second design category is the "power tower." This design uses many heliostats (small mirrors that track the sun) and points them all to a common focal point. At this focal point can be PV cells or a sterling engine.

The third design is commonly used (albeit in small numbers) in commercial power plant applications and is known in the industry as a solar trough. This design utilizes a single mirror that is parabolic along only one axis that looks something like a trough. This mirror collects sunlight and then focuses this sunlight into a line. At the focus can be a pipe that contains a working substance to be heated, or PV cells. This design has the advantage of a mirror that is easy to manufacture in small size sheets since it is curved in only one direction and it is relatively easy to apply a reflective coating or a glass mirror. Another advantage is the light in the focal plane can form a rectangular shape, important for focusing light onto rectangular PV cells or a continuous pipe structure. The primary drawback to this design is that since sunlight is concentrated only along one axis, a very large mirror is required to achieve high concentrations. Constructing, supporting, and controlling such large mirrors turns out to be a costly endeavor, in fact, too costly to offset the savings produced by needing fewer PV cells.

Because the trough structure establishes and maintains optical alignment of the parabolic mirror or mirror sections, it must be capable of withstanding wind and of securely supporting other solar collector substructures without significantly distorting the mirror shape. Thus, steel trusses anchoring in a concrete foundation is a common trough structure design. However, this and other currently used trough designs are relatively expensive (i.e., they can represent up to 40% of the total solar collector cost), heavy, and cause concerns over longevity and ability to keep mirrors in alignment during periods of high winds.

In view of the problems experienced with the construction and operation of cost-effective solar collectors/concentrators, a need continues to exist for a solar concentrator trough structure that has a minimum of components and has the potential to be less costly to manufacture and maintain while providing a strong supporting structure that better ensures efficient performance of the light collecting surface.

SUMMARY OF THE INVENTION

The invention relates in general to a solar collector that includes a reflective surface formed parabolic along an axis and a new and improved parabolic trough structure. More particularly, the invention involves a trough structure that supports a reflective surface and includes at least one cementitious material. Preferably, the trough structure further includes a filler material at least partially encased by the cementitious material.

The filler material preferably is chosen from the group consisting of a chopped natural or a synthetic fiber. Thus, in one embodiment of the invention, the filler material is a straw or straw-like material. The filler provides support for the cementitious material, while lessening the overall weight of the trough structure.

In another embodiment of the invention, the trough structure further includes a sheeting material disposed upon over the filler material. The sheeting material preferably comprises a plastic or plastic-like film such that it aids the flowability of the cementitious material during the casting process.

In a preferred method embodiment of the invention, constructing a solar trough includes the steps of providing a parabolic-shaped mold, providing a filler material within the parabolic mold, at least partially encasing the filler material with a cementitious material, and coupling a reflective element to a surface of the cementitious material.

The mirrors or reflective surfaces of the collector can be made of any plastic that can be directly applied or thermoformed, such as Acrylic or Polycarbonate, and coated with a reflective Mylar film that can be protected from UV radiation via a poly-vinyl substrate. Since the curve on each of the mirrors used in the present invention is not a compound curve, a flat sheet of Acrylic can be easily thermoformed to the desired curve using a thermoforming technique that is inexpensive to implement. A mosaic of glass strips can also be employed.

Each mirror or reflective surface rests on a support that help each mirror keep its optical shape. This support is known as a trough structure. The trough structure plays an important role in the present invention since plastics and glass in general are not dimensionally stable. The trough structure must be adjoined to the mirror in a manner that does not distort its figure.

Additional features and advantages of the invention will be forthcoming from the following detailed description of certain specific embodiments when read in conjunction with the accompanying drawings.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1 illustrates a front elevational view of a solar trough collector.

FIG. 2 illustrates a cross-sectional view taken along line 2-2 in FIG. 1.

FIG. 3 illustrates a fragmentary magnified view taken from phantom line 3 in FIG. 2.

DETAILED DESCRIPTION OF THE DRAWINGS

Figure 4:
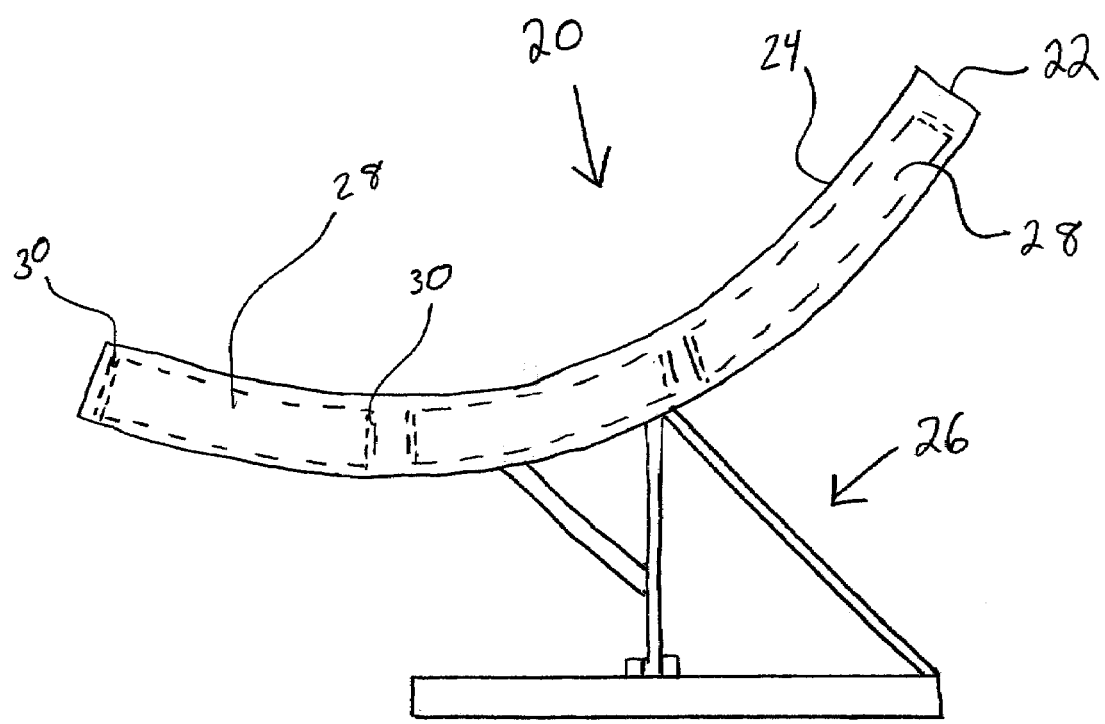
FIG. 4 is an elevational side view of a second embodiment of the invention.

Turning to FIG. 1, a solar trough 4 of the invention is shown. A reflective surface 6 is formed parabolic along an axis 8 and is a supported by a parabolic trough structure 10 composed of at least one cementitious material.

As seen in the cross-sectional view of FIG. 2, the trough structure 10 preferably further includes a filler material 12 that is at least partially encased by a cementitious material 14. Preferably, the cementitious material is polymer concrete. However, other cement compositions may be used instead of, or in addition to, polymer concrete. In order to keep the trough structure 10 strong and rigid, yet lessen the weight of the structure, the filler material preferably is a chopped natural or synthetic fiber. Straw or straw-like grass material is especially preferred, given its abundance and relatively low cost.

Turning to the magnified fragmentary view of FIG. 3, the trough structure 10 preferably further includes a sheeting material 16 disposed upon the filler material 12. The sheeting material 16 preferably is a plastic or plastic-like film. By at least partially covering or encasing the filler material 12 with the sheeting material 16, the cementitious material 14 better flows around the filler material.

As seen in FIG. 4, one fully assembled solar collector 20 of the invention includes a parabolic trough 22 having a reflective surface 24 and a support scaffold 26. The trough 22 is made from cementitious material and includes three bales of straw 28 or other filler material disposed within the trough interior (as shown, the bales are laid end-to-end; however, they also could be arranged otherwise, e.g., side-to-side). Preferably, the bales 28 have rounded (e.g., 45 degree) corners 30 such that gussets are formed, thereby adding strength and rigidity to the trough 22.

Figure 5A:
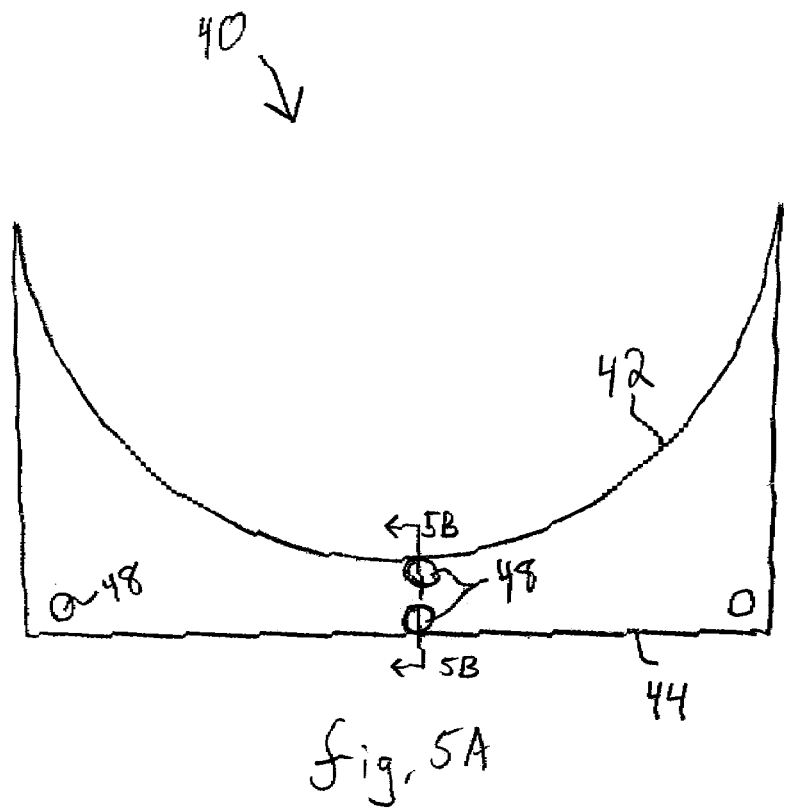
FIG. 5A is a perspective view of a third embodiment of the invention.
Figure 5B:
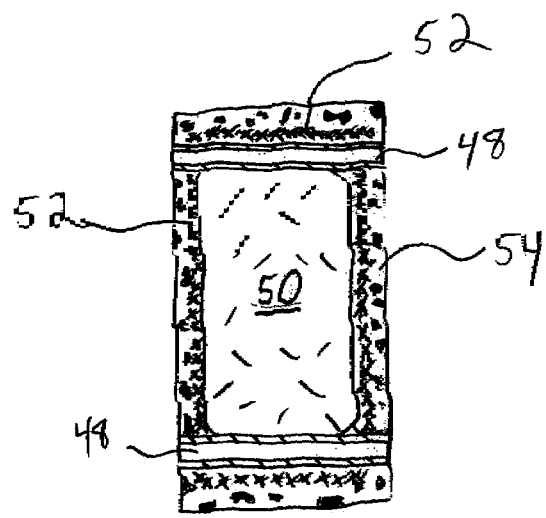
FIG. 5B is an enlarged cross-sectional view of the embodiment of FIG. 5A.

Turning to FIGS. 5A and 5B, a third embodiment is depicted in perspective view and in cross-section. Trough 40 has a parabolic top surface 42 and a flat bottom surface 44. So that different sections of troughs can be arrayed together with clamps or other fasteners, rods 48 may be transversely disposed through the trough structure during casting. The rods may be rebar, steel pipe, or other material suitable for joining different troughs together to form an array. Using a hollow rod, such a pipe, also allows for the trough 40 to be pivoted through, for example, mounting a bearing within the pipe (not shown). Furthermore, the pipe can be a conduit for electricity or fluids.

In the cross-sectional view of this embodiment, the filler material (straw bale 50) is surrounded by a mesh member 52 and incased in cement 54. The mesh member 52 preferably is used to hold the bale 50 in place during casting and to provide additional structural support. Suitable materials for mesh member 52 include, but are not limited to, steel chain link fence panels and wire mesh panels.

Figure 6:
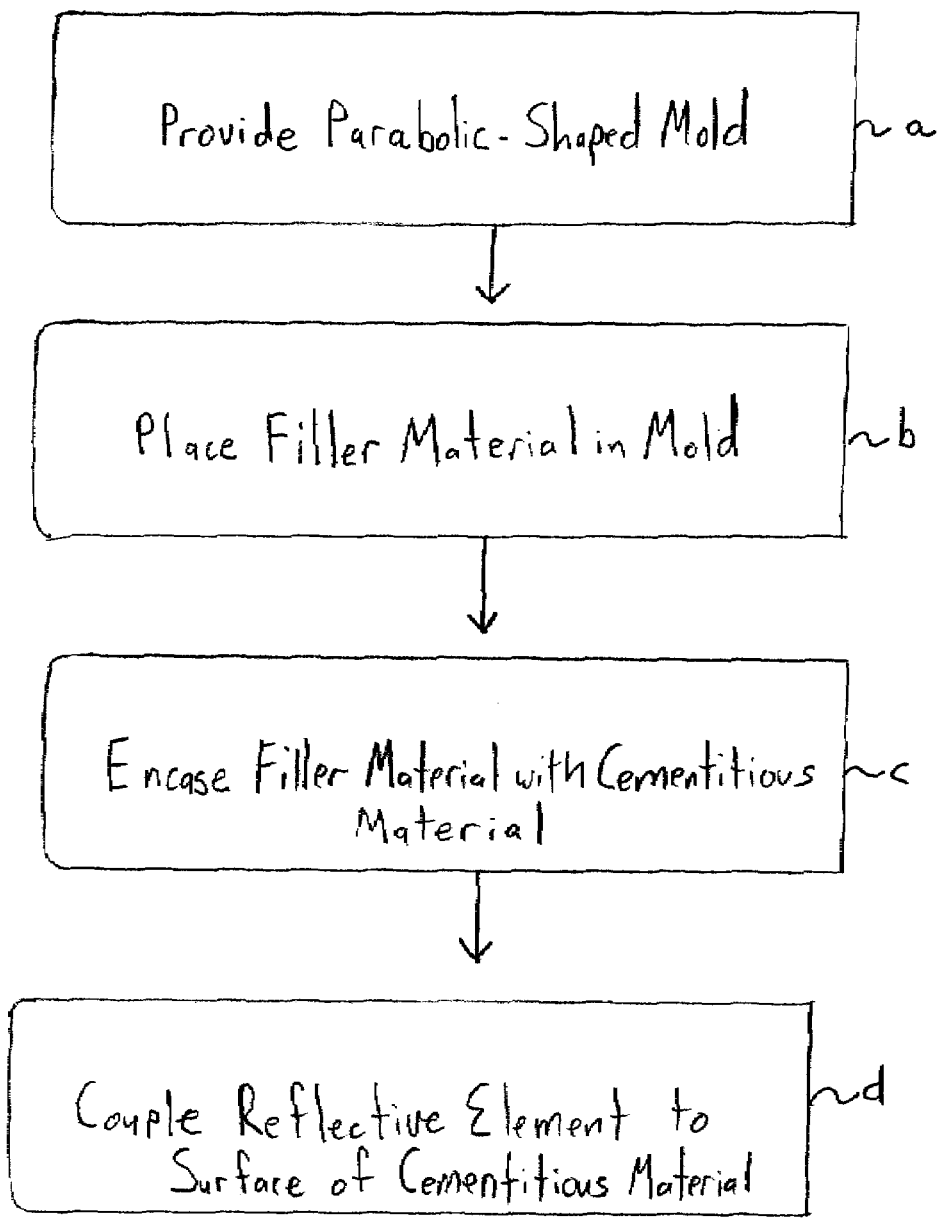
FIG. 6 is a flow diagram of a method of the invention.

As shown in FIG. 6, a method for constructing a solar trough according to the invention involves the steps of: (a) providing a parabolic-shaped mold; (b) providing a filler material within the parabolic mold; (c) at least partially encasing the filler material with a cementitious material; and (d) coupling a reflective element to a surface of the cementitious material.

Preferably, the reflective element is attached directly to the cementitious material, thereby forming a parabolic optical axis and taking advantage of the rigidity of cement. Also preferably, the filler material is at least partially enveloped with a sheeting material prior to step (c). If different troughs are to be joined together, at least one rod is cast into each trough such that the rod of one trough can be coupled to the rod of another to form an array.

While not intending to limit the invention, the following example is disclosed to further illustrate the invention method.

A parabolic-shaped form is constructed of wood and secured to the top of a parabolic-shaped mold having a non-adhesive film disposed over the top of the mold. If desired, holes may be provided in the form such that pipes (used to link different troughs together as described above) may be inset laterally through the form.

In order to better hold filler materials (to be added) in place, chain link fence sections are form-fitted to the entire interior of the assembled mold. Next, cement is poured into the mold such that the fence section on the bottom surface of the mold is covered (typically a depth of 2-3 inches) and allowed to set. Plastic-wrapped straw bales now are placed in the mold on top of the cement and arranged such that each bale is about 1-2 inches from the mold sides and 1 inch or less from each other. Another panel of chain link fence is disposed over the top of the bales to better secure them in place.

Next, cement is poured over the bales such that they and the fence panel are encased. The top surface of the cement is smoothed and the entire trough is allow to set before the form on the sides of the mold is removed. The trough is then lifted from the mold, and further processing takes place to add a reflective surface and, if desired, additional structures.

While one or more embodiments of the present invention have been illustrated in detail, the skilled artisan will appreciate that modifications and adaptations to those embodiments may be made without departing from the scope of the present invention as set forth in the following claims.

What is claimed is:

1. A solar trough, comprising:
   a reflective surface formed parabolic along an axis; and
   a trough structure including at least one parabolic face and composed of a cementitious material, wherein said reflective surface is disposed upon the parabolic face of the trough structure, and wherein said trough structure further includes a bale of filler material that is encased on at least two sides by a plastic or plastic-like film material and is encased on at least four sides by said cementitious material.

2. The trough of claim 1, wherein said cementitious material is polymer concrete.

3. The trough of claim 1, wherein said filler material is selected from the group consisting of chopped natural or synthetic fibers.

4. The trough of claim 3, wherein said filler material is a straw or straw-like material.

5. The trough of claim 4, wherein said straw or straw-like material is at least partially surrounded by a mesh member.

6. The trough of claim 1, wherein said bale has at least one rounded corner forming a gusset with said film and cementitious material.

7. The trough of claim 1, wherein said filler material is at least partially surrounded by a mesh member.

8. A solar trough, comprising:
- a parabolic trough structure that includes a bale of filler material encased by a plastic or plastic-like film material, said film material and filler material further being enveloped by a cementitious material that encloses said bale of filler material on at least four sides, and said bale of filler material further including rounded corners forming gussets with said film and cementitious material; and
- a reflective surface formed parabolic along an axis upon a surface of said parabolic trough structure.

* * * * *